US007510999B2

(12) United States Patent
Deng et al.

(10) Patent No.: US 7,510,999 B2
(45) Date of Patent: Mar. 31, 2009

(54) LUBRICANT COMPOSITION FOR MAGNETIC RECORDING MEDIA

(75) Inventors: Hong Deng, San Jose, CA (US); Robert Waltman, Gilroy, CA (US); Jinliu Wang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 755 days.

(21) Appl. No.: 10/856,116

(22) Filed: May 28, 2004

(65) Prior Publication Data

US 2005/0277558 A1      Dec. 15, 2005

(51) Int. Cl.
C10M 137/16    (2006.01)
G11B 5/725     (2006.01)
(52) U.S. Cl. .................. 508/422; 508/559; 508/582; 428/833.4; 428/835.8; 428/843.5
(58) Field of Classification Search ............ 508/422
See application file for complete search history.

(56) References Cited

U.S. PATENT DOCUMENTS

| 4,721,795 | A | | 1/1988 | Caporiccio et al. |
| 4,897,211 | A | | 1/1990 | Dekura et al. |
| 5,441,655 | A | * | 8/1995 | Odello et al. ............ 508/422 |
| 5,453,539 | A | | 9/1995 | Kondo et al. |
| 5,498,457 | A | | 3/1996 | Ishihara et al. |
| 5,560,995 | A | | 10/1996 | Usuki et al. |
| 5,587,217 | A | | 12/1996 | Chao et al. |
| 5,820,964 | A | | 10/1998 | Nakakawaji et al. |
| 5,869,186 | A | | 2/1999 | Usuki et al. |
| 5,908,817 | A | | 6/1999 | Perettie et al. |

(Continued)

FOREIGN PATENT DOCUMENTS

JP          2073514         3/1990

(Continued)

OTHER PUBLICATIONS

O'Connor et al. (1996), "Surface Diffusion of Thin Perfluoropolyalkylether Films," *J. Appl. Phys.* 79(8):5788-5790.

*Primary Examiner*—Ellen M. McAvoy
(74) *Attorney, Agent, or Firm*—Mintz, Levin, Cohn, Ferris, Glovsky & Popeo, P.C.

(57) ABSTRACT

A lubricant composition is provided comprising a first liquid lubricant and a second liquid lubricant, wherein the first liquid lubricant contains a cyclotriphosphazene ring attached to at least one perfluoropolyether having a single terminal hydroxyl group, and the second liquid lubricant contains a perfluoropolyether having two end groups selected from hydroxyl, tertiary amine, and combinations thereof. A magnetic recording media is also provided, comprising a substrate, a magnetic layer, an overcoat layer and a lubricant layer thereon, wherein the lubricant layer is formed from the lubricant composition. A further aspect of the invention concerns a method of making a magnetic recording media comprising forming a magnetic layer on a substrate; forming a protective overcoat layer on the magnetic layer; and forming a lubricant layer on the surface of the overcoat layer by applying the lubricant composition to the surface of the overcoat layer. The lubricant composition is useful for magnetic recording media, especially for magnetic storage hard disk drives, and provides improvements such as substantially reduced lubricant thickness variations when applied to a surface of a hard disk drive.

16 Claims, 2 Drawing Sheets

U.S. PATENT DOCUMENTS

| | | | |
|---|---|---|---|
| 6,025,310 A * | 2/2000 | Nishiguchi et al. | 508/582 |
| 6,468,947 B1 | 10/2002 | Falcone et al. | |
| 6,605,335 B2 | 8/2003 | Tani et al. | |
| 6,608,009 B2 * | 8/2003 | Akada et al. | 508/422 |
| 6,643,098 B2 | 11/2003 | Takahashi | |
| 6,645,634 B1 | 11/2003 | Shirai et al. | |
| 6,686,019 B1 | 2/2004 | Liu et al. | |
| 6,730,403 B1 * | 5/2004 | Shirai et al. | 428/833.5 |
| 6,816,341 B2 * | 11/2004 | Matsumoto et al. | 360/135 |
| 7,026,509 B2 * | 4/2006 | Russo et al. | 564/13 |
| 7,252,897 B2 * | 8/2007 | Shimokawa et al. | 428/833 |
| 7,277,254 B2 * | 10/2007 | Shimokawa et al. | 360/135 |
| 2002/0119316 A1 | 8/2002 | Shukla et al. | |
| 2003/0232220 A1 | 12/2003 | Yatsue | |

FOREIGN PATENT DOCUMENTS

| | | |
|---|---|---|
| JP | 5347020 | 12/1993 |
| JP | 10124844 | 5/1998 |

* cited by examiner

LUBRICANT COMPOSITION FOR MAGNETIC RECORDING MEDIA

FIELD OF THE INVENTION

This invention relates to an improved lubricant composition for magnetic recording media, especially for magnetic storage hard disk drives. More particularly, the invention relates to improvements such as substantially reduced lubricant thickness variations when the lubricant composition is applied to a surface of a hard disk drive.

BACKGROUND OF THE INVENTION

Highly functionalized, polar perfluorinated polyethers ("PFPE") are currently used as lubricants in a variety of high-performance applications, for example to lubricate hard disc drive ("HDD") media, as well as to lubricate precision mechanical instruments to minimize mechanical wear. PFPEs also function as anti-wetting and/or corrosion-protective agents on metal-containing substrates, particularly in magnetic recording devices such as magnetic recording disks and magnetic recording heads. See, for example, U.S. Pat. No. 6,638,622 to Dai et al., which describes novel metal salts of perfluorinated polyethers.

One important area in which perfluorinated polyethers find utility is as lubricant layers in magnetic storage devices such as magnetic storage disks and magnetic recording heads. Of particular interest are magnetic storage disks and magnetic recording heads that have an overcoat of essentially amorphous carbon, as disclosed, for example, in U.S. Pat. No. 5,030,494 to Ahlert et al. and U.S. Pat. No. 5,075,287 to Doemer et al., both assigned to IBM Corporation. As described in the aforementioned patents, rotating rigid disk drives may include read/write transducers (or "heads") supported on a carrier (or "slider") that ride on a cushion or bearing of air above the surface of a magnetic recording disk when the disk is rotating at operating speed. The slider has an air-bearing surface ("ABS"), typically in the form of a plurality of rails, and is connected to a linear or rotary actuator by means of a suspension. There may be a stack of disks in the disk drive with the actuator supporting a number of sliders. The actuator moves the sliders radially so that each head may access the recording area of its associated disk surface. The slider in the disk drive is biased toward the disk surface by a small force from the suspension. The ABS of the slider is thus in contact with the disk surface from the time the disk drive is turned on until the disk reaches a speed sufficient to cause the slider to ride on the air bearing. The ABS of the slider is again in contact with the disk surface when the disk drive is turned off and the rotational speed of the disk fails below that necessary to create the air bearing. This type of disk drive is called a contact start/stop (CSS) disk drive. To provide wear resistance for the ABS in a CSS disk drive, a protective carbon overcoat may be placed on the slider rails. U.S. Pat. No. 5,159,508 describes a slider with air-bearing rails having an amorphous carbon overcoat that is adhered to the rails by a silicon adhesion layer.

The magnetic recording disk in a CSS rigid disk drive is typically a thin film disk comprising a substrate, such as a disk blank made of glass, ceramic, glassy carbon or an aluminum-magnesium (AlMg) alloy with a nickel-phosphorous (NiP) surface coating, and a cobalt-based magnetic alloy film formed by sputter deposition over the substrate. A protective overcoat, such as a sputter-deposited amorphous carbon film, is formed over the magnetic layer to provide corrosion resistance and wear resistance from the ABS of the slider. The overcoat may further include relatively small amounts of embedded iron (Fe), tungsten (W) or tungsten carbide (WC) to improve wear resistance and minimize the likelihood of damage to disk file components (see U.S. Pat. No. 5,030,494 to Ahlert et al., cited above). Such overcoats are typically formed by sputter deposition from a graphite target, and are generally called protective carbon overcoats, "diamondlike" carbon overcoats, amorphous carbon overcoats, or, in the case of those overcoats formed by sputter deposition in the presence of a hydrogen-containing gas, hydrogenated carbon overcoats. In addition to the magnetic layer and the protective overcoat, the thin film disk may also include a sputter-deposited underlayer, such as a layer of chromium (Cr) or a chromium-vanadium (CrV) alloy, between the substrate and the magnetic layer, and a sputter-deposited adhesion layer, such as a Cr, tungsten (W) or titanium (Ti) layer, between the magnetic layer and the protective overcoat.

A lubricant topcoat is conventionally applied as a uniform layer over the protective overcoat to prevent wear between the disk and head interface during drive operation. Excessive wear of the protective overcoat increases friction between the head and disk, thereby causing catastrophic drive failure. On the other hand, excess lubricant at the head-disk interface may cause high resistance between the head and disk (i.e., a high coefficient of friction between the head and disk at rest) such that, if the resistance is excessive, the drive cannot start and catastrophic failure may occur.

Due to the demand for increased recording density and faster data transfer rates, leading in part to the development of smoother disk surfaces and lower head flying heights, a continuing need exists for the development of new lubricants to serve as a lubricating topcoat overlying the protective overcoat. Such lubricants must perform a variety of different functions requiring diverse characteristics and attributes. For example, the lubricant forming the topcoat is preferably chemically inert, possesses a low vapor pressure, low surface tension, high thermal stability, stability under high shear stress, good boundary lubrication properties, and good adhesion to the underlying surface over the lifetime of the magnetic recording media. It is also important that the lubricant possesses the ability to maintain a uniform thickness on the magnetic recording media.

One of the most widely used lubricants is Fomblin Z-Tetraol™, a tetra-hydroxyl functionalized PFPE (Solvay Solexis, Inc.). Unfortunately, PFPEs tend to have poor solubility in relatively non-polar fluorinated solvents, which are commonly used as the lube bath solvents for deposition of functionalized PFPEs on disks for HDD applications. Even at low concentrations, a Fomblin Z-Tetraol™ solution in a hydrofluorocarbon or hydrofluoroether solvent, is found to be cloudy and turbid due to the poor solubility of the PFPE lubricant in the fluorinated solvents. Lubricant layers formed from Z-Tetraol™ also suffer from other disadvantages including relatively low durability and inadequate head clearance on smooth disk surfaces compared with other lubricants.

Other commercially available PFPE lubricants useful for hard disk drive lubricant layers include the A20H™ family of lubricants from Moresco (Matsumura Oil Research Corporation), which are generally described as perfluoropolyethers containing a cyclotriphosphazene ring. Two of such lubricants are designated as A20H-2000™ and A20H-4000™, having perfluoropolyether segment number average molecular weights of 2000 and 4000, respectively. While the A20H™ lubricants provide good slider-disk mechanical clearance in low-flying hard disk drives (<10 nm flying height) when employed as a neat lubricant on a rigid magnetic disk, they too suffer from several disadvantages. One such problem occurs due to the interactions between the head and the disk that leads to the formation of non-uniform lubricant distributions on the disk surface, variously known in the art as "lube moguls" and/or "lube ripples."

In order to overcome some of the deficiencies of lubricants for hard disk drives, compositions of more than one lubricant have been described and provided in the art. For example, in U.S. Pat. No. 6,468,947 to Falcone et al., a lubricant composition is described comprising a first fluorpolyether and a second fluoropolyether having nitrogen containing end groups in which the composition is said to exhibit improved resistance to acid and thermal decomposition. U.S. Pat. No. 6,686,019 to Liu et al., describes a method for in situ stabilizing a composite lubricant of at least two mutually immiscible lubricant components (e.g., a phosphazene derivative and a perfluoropolyether lubricant) by treating a lubricant layer formed therefrom with UV radiation. The composite lubricant layer is said to have reduced or substantially eliminated phase separation of the lubricant components.

U.S. Pat. No. 5,908,817 to Perettie et al., also describes a lubricant comprising a mixture of a perfluorpolyether and a cyclic phosphazene in which the static and dynamic coefficients of friction are said to be low and balling effects (i.e., phase separation leading to chemical nonuniformity of the lubricant on the disk) are minimized.

In U.S. Pat. No. 6,605,335 to Tani et al., a magnetic recording media lubricant composition is described in which the lubricant comprises a dicyclotriphosphazene-perfluoropolyether compound having a specific structure, and compositions of such compounds that may be mixed with other lubricants such as Fombrin Z-dol™.

Despite advances in the art, a continuing need exists for improved lubricants for magnetic recording media, however, particularly for hard disk drive applications. The present invention addresses such needs by providing an improved lubricant composition that, among other advantages, demonstrates improved lubricant uniformity on hard disk surfaces, in particular, substantially reduced lubricant thickness variations compared with other lubricants or lubricant compositions.

SUMMARY OF THE INVENTION

It is a general object of the invention to provide a lubricant composition for use as a lubricant for magnetic recording media, to provide a magnetic recording media having a lubricant layer thereon formed from the lubricant composition, and to provide a method for making an improved lubricant composition and a magnetic recording media having a lubricant layer thereon formed from the lubricant composition.

One aspect of the invention therefore relates to a lubricant composition for use as a lubricant for magnetic recording media, comprising a first liquid lubricant and a second liquid lubricant, wherein the first liquid lubricant contains a cyclotriphosphazene ring attached to at least one perfluoropolyether having a single terminal hydroxyl group, and the second liquid lubricant contains a perfluoropolyether having two end groups selected from hydroxyl, tertiary amine, and combinations thereof.

Another aspect of the invention pertains to a magnetic recording media comprising a substrate, a magnetic layer, an overcoat layer and a lubricant layer thereon, wherein the lubricant layer is formed from the lubricant composition comprising a first liquid lubricant and a second liquid lubricant, wherein the first liquid lubricant contains a cyclotriphosphazene ring attached to at least one perfluoropolyether having a single terminal hydroxyl group, and the second liquid lubricant contains a perfluoropolyether having two end groups selected from hydroxyl, tertiary amine, and combinations thereof.

A further aspect of the invention concerns a method of making a magnetic recording media comprising:
  forming a magnetic layer on a substrate;
  forming a protective overcoat layer on the magnetic layer; and
  forming a lubricant layer on the surface of the overcoat layer by applying the lubricant composition of claim 1 to the surface of the overcoat layer.

Additional aspects, advantages and novel features of the invention will be set forth in part in the figures and detailed description that follow, and will become apparent to those skilled in the art upon examination of the following, or may be learned by practice of the invention through routine experimentation.

DETAILED DESCRIPTION OF THE INVENTION

Definitions and Overview

Figure 1:
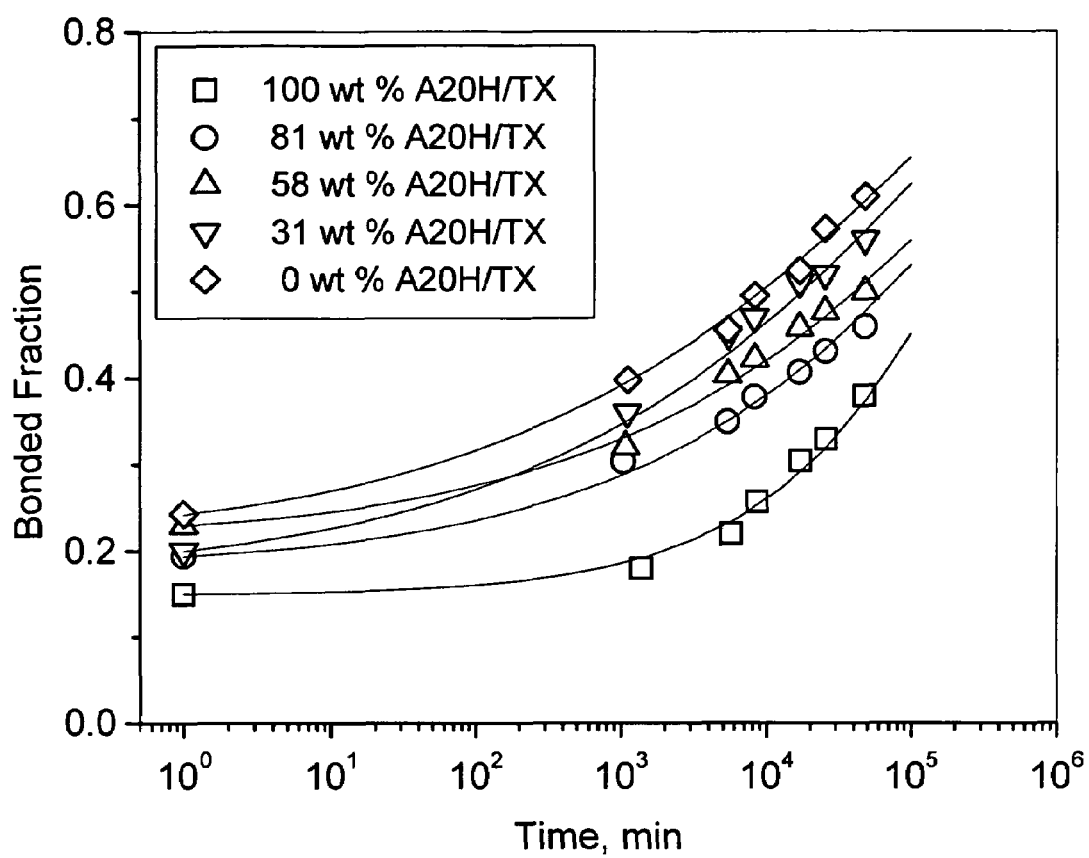
FIG. 1 shows lubricant bonding results for lubricant compositions according to the invention comprising Moresco A20H-4000™ and Fomblin Zdol-TX™ lubricants as described in Example 1.

Before describing the present invention in detail, it is to be understood that this invention is not limited to specific substrates, magnetic recording devices, process steps, or the like, as such may vary. It is also to be understood that the terminology used herein is for the purpose of describing particular embodiments only, and is not intended to be limiting.

The definitions set forth herein apply only to the terms as they are used herein and may not be applicable to the same terms as used elsewhere, for example in scientific literature or other patents or applications including other applications by these inventors or assigned to common owners. The following description of embodiments and examples are provided by way of explanation and illustration. As such, they are not to be viewed as limiting the scope of the invention as defined by the claims. Additionally, when examples are provided, they are intended to be exemplary only and not to be restrictive. As well, when an example is said to "include" a specific feature, it is intended to imply that it may have that feature but not that such examples are limited to those that include such features.

As used in this specification and in the appended claims, the singular forms "a", "an" and "the" include plural referents unless the context clearly dictates otherwise. Similarly, the phrase "a combination thereof" includes mixtures of one or more of the same category of referent, as well as mixtures of different referents. For example, the combination of perfluoropolyethers having two end groups is intended to include single perfluoropolyethers having one or more types of end groups, in addition to a mixture of perfluoroethers having one or more types of end groups. The same understanding also applies for other combinations described herein.

In describing and claiming the present invention, the following terminology is used in accordance with the definitions set out below.

By the phrase "substantially reduced lubricant thickness variations," it is generally intended that the variation in the lubricant thickness on a surface of the magnetic recording media (e.g., a hard disk surface) of the invention lubricant composition is measurably reduced compared with a lubricant composition containing only the first liquid lubricant, but not the additional second liquid lubricant. While the numerical range for such reduced thickness variation will depend on the particular lubricant components of the composition, as well as other factors such as the test conditions, it is intended that the lubricant pooling thickness is reduced (as further discussed in the Examples).

As the skilled artisan will appreciate, a number of factors influence the formation of lubricant thickness variations (i.e., lube moguls) during disk operation, including ABS slider design, disk and slider surface topology, head suspension design and head flying height, and the bonding between the overcoat and lubricant at the interface between the two, to name a few. It is therefore not generally possible to precisely specify the amount of reduction in lubricant thickness variation. However, the skilled artisan can determine the amount of reduction using only routine experimentation.

The reduction in lubricant thickness variation may be generally measured by determining the variation in lubricant thickness that occurs for a lubricant coated disk substrate compared with the lubricant thickness before the disk is placed in operation. The amount of reduction may then be based on a comparison of peak lubricant heights formed on the disk between a control lubricant and a comparison lubricant or lubricant composition. For example, for disks coated with a 10 Å lubricant layer, peaks heights for lubricants not according to the invention may generally be in the range of 5-20 Å. By comparison, for lubricant compositions according to the invention, the peak heights are generally substantially reduced to a range of about 1-6 Å, preferably about 1-3 Å (all other operational conditions and head/disk components being the same other than the lubricant). Although not limited thereto, on a percentage basis, the reduction in lubricant thickness variation intended to be associated with the phrase "substantially reduced lubricant thickness variations" is generally in the range of about 10% to 90% or greater, preferably at least about 20%, and more preferably at least about 40%.

By the term "effective amount" of the first lubricant or the second lubricant is meant that the additional second lubricant provides an improvement in the properties of the lubricant composition, particularly a substantially reduced lubricant thickness variation, as noted above. The exact amount required will vary, depending on the particular first and second lubricants present in the composition and the like. Thus, it is not possible to precisely specify an exact "effective amount." However, an appropriate "effective" amount in any individual case may be determined by one of ordinary skill in the art using only routine experimentation.

Lubricant Compositions

The lubricant compositions of the invention comprise a first liquid lubricant and a second liquid lubricant, wherein the first liquid lubricant contains a cyclotriphosphazene ring attached to at least one perfluoropolyether having a single terminal hydroxyl group, and the second liquid lubricant contains a perfluoropolyether having two end groups selected from hydroxyl, tertiary amine, and combinations thereof. In general, the amounts each of the first liquid lubricant and the second liquid lubricant may each vary over the range from greater than zero to less than 100% by weight. That is, at least some amount of each of the first lubricant and the second lubricant is present in the composition. Stated another way, it is intended that the first lubricant or the second lubricant be present in an "effective amount" such that the properties of the lubricant composition, particularly a lubricant layer formed on a hard disk, are improved compared with a lubricant containing the first or the second lubricant, but not the corresponding additional lubricant component of the composition, i.e., the second or the first lubricant, respectively. More particularly, it is intended that the lubricant layer thickness variation on such hard disks be substantially reduced due to the presence of an amount effective to provide such reduction, of either the first or the second lubricant when combined with the second or first lubricant, respectively. As explained above, the precise amount of such reduction depends on a number of factors associated with the disk and the head, as well as the lubricant and the bonding of the lubricant to the overcoat layer.

It an embodiment, the first liquid lubricant is present in an amount from about 2% to about 98% by weight and that the second liquid lubricant is present in an amount from about 98% to about 2% by weight based on the weight of the first and second lubricants. More preferably, the amount of the first liquid lubricant is from about 25% to about 75% by weight and the amount of the second liquid lubricant is from about 75% to about 25% by weight based on the weight of the first and second lubricants. Additional lubricants may also be included if necessary or desired to achieve particular effects.

The lubricant composition may include one or more suitable mutual solvents for the first lubricant and the second lubricant. Suitable solvents include hydrocarbons and perfluorinated solvents such as are described in, e.g., U.S. Pat. No. 5,587,217. The amount of the first and second lubricants in such solvents is not particularly limited and may be varied by the skilled artisan to achieve a desired coating thickness. Typically, the total concentration of the first and second lubricants ranges from about 0.001% to a few percent in such solvents.

Perfluorinated Polyethers

Perfluorinated polyethers, also termed perfluoropolyethers, include fluorinated oligomers, homopolymers and copolymers of polyethers. In general, perfluoropolyethers suitable for use as the first liquid lubricant of the invention contain a cyclotriphosphazene ring attached to at least one perfluoropolyether having a single terminal alcohol group.

In one embodiment, the first liquid lubricant has the structure of formula (I)

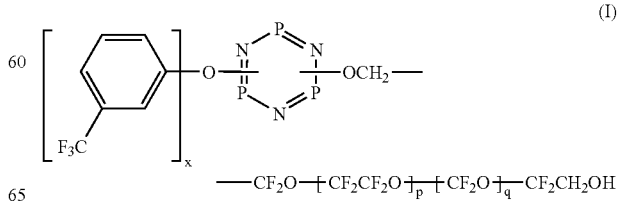

wherein, x is an integer from 1 to 5, p is an integer from 5 to 36 and q is an integer from 4 to 30. Preferred first lubricants include those in which x is 5, such that the first liquid lubricant has the structure of formula (Ia)

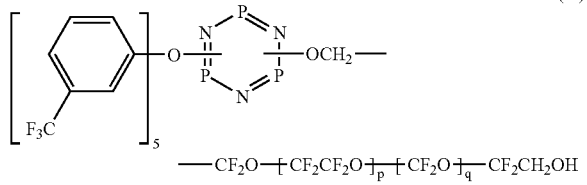   (Ia)

and p and q are as defined above for formula (I).

Typically, the perfluoropolyether of the first liquid lubricant has a number average molecular weight in the range of about 2000 to about 6000, although perfluoropolyethers having molecular weights outside this range may also be used. An exemplary first liquid lubricant perfluoropolyether having the structure of formula (Ia) is commercially available from Moresco (Matsumura Oil Research Corporation) as the A20H™ family of lubricants. Two of such lubricants useful as the first lubricant of the invention are designated as A20H-2000™ and A20H-4000™, having perfluoropolyether segment number average molecular weights of 2000 and 4000, respectively.

The second liquid lubricant generally contains a perfluoropolyether having two end groups selected from alcohol, tertiary amine, and combinations thereof. In one embodiment, the second liquid lubricant contains a perfluoropolyether selected from compounds having the structure of formula (IIa), formula (IIb), and combinations thereof, wherein formulae (IIa) and (IIb) have the structures R—[CH$_2$]$_r$—[CF$_2$O]$_s$—[CF$_2$CF$_2$O]$_t$—[CF$_2$O]$_u$—CF$_2$—[CH$_2$]$_v$—R$^1$   (IIa)

R$^1$RN—[CH$_2$]$_r$—[CF$_2$O]$_s$—[CF$_2$CF$_2$O]$_t$—[CF$_2$O]$_u$—CF$_2$—[CH$_2$]$_v$—NRR$^1$   (IIb)

in which r, s, t, u and v are independently zero or an integer, with the proviso that s, t and u are not all zero, and R and R$^1$ are independently selected from

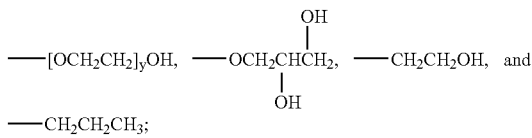

wherein y is an integer from 1 to 6. In formulae (IIa) and (IIb), it is preferred that r is zero or an integer from 1 to 6, more preferably 1 to 2, s is zero or an integer from 1 to 40, more preferably 2 to 20, t is zero or an integer from 1 to 40, more preferably 2 to 20, u is zero or an integer from 1 to 6, more preferably 1 to 2, and v is zero or an integer from 1 to 6, more preferably 1 to 2, with the proviso that s, t and u are not all zero, as noted previously.

Suitable second liquid lubricants are commercially available and include Fomblin Zdol-TX™ and Z-Tetraol™ (Solvay Solexis Inc.), and ZDEA™ and ZEEA™ from Moresco, having the following chemical structures:

Zdol-TX:
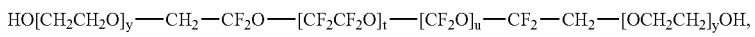
Z-Tetraol:
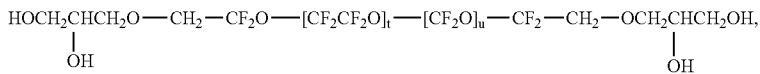
ZDEA:
ZEEA:
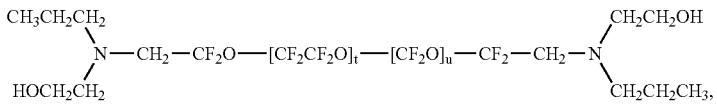

in which t and u are non-zero integers.

Typically, the perfluoropolyether of the second liquid lubricant has a number average molecular weight in the range of about 1000 to about 6000, although perfluoropolyethers having molecular weights outside this range may also be used.

It is preferred that the second liquid lubricant is selected from Zdol-TX™, Z-Tetraol™, ZDEA™ and ZEEA™ and combinations thereof, wherein each lubricant has the chemical structure noted above.

The lubricant compositions according to the invention provide a substantial reduction in lubricant thickness variation compared with lubricants that do not contain a first liquid lubricant and a second liquid lubricant as described above. For example compared with A20H™ family of lubricants in which lube moguls in the range of about 5-20 Å (peak heights) may be formed during disk operation, the lubricant compositions according to the invention provide a reduction of lube mogul peak heights (i.e., lube pooling thicknesses) to the range of about 1-6 Å, preferably 1-3 Å. Although not limited thereto, on a percentage basis, the reduction in lubricant thickness variation is generally at least about 10%, preferably at least about 20%, and more preferably at least about 40%.

Magnetic Recording Media

The magnetic recording media generally comprises a substrate, a magnetic layer, an overcoat layer and a lubricant layer thereon, wherein the lubricant layer is formed from the lubricant composition of the invention, as noted above. Methods of making magnetic recording media, as well as the structure of such media, such as hard disks for hard disk drives, are well known in the art and need not be described in detail herein. Further details of such disk structures and hard disk drives may be found in, e.g., U.S. Pat. No. 6,638,622.

The lubricant layer formed on the magnetic recording media from the lubricant composition of the invention may be applied in conventional thicknesses, without limitation. Although the needs of the particular application will play a part in determining the appropriate thickness, generally such lubricant layer thicknesses are in the range from about 2 to about 15 Å.

In hard disk drive applications, the lubricant composition provides substantially reduced lubricant thickness variations when applied to a surface of the hard disk compared with a lubricant composition containing the first liquid lubricant but not the second liquid lubricant. More particularly, the lubricant thickness variation on a surface of the magnetic recording media (e.g., the lubricant pooling thickness or the presence of "lube moguls" on a hard disk surface) is measurably reduced as explained above for the invention lubricant composition compared with a lubricant composition containing only the first liquid lubricant, but not the second liquid lubricant. As discussed in the Examples, the invention lubricant composition also allows for control of the bonding kinetics and thereby the fraction of mobile lubricant on the surface of a magnetic hard disk.

Methods of Preparation and Use

The lubricant compositions of the invention may be prepared according to any suitable method known in the art such as by mixing of the first lubricant and the second lubricant in a solvent for each lubricant.

Useful methods for preparing lubricant composition layers include any of a number of conventional methods including spray buff using a tape roll, spin coating, pull-up dip coating, or gravity draining, with gravity draining (also known as "drain coating") and dip coating being preferred. Drain coating involves submerging the disk in a dilute solution of the lubricant composition in a solvent for the first lubricant and the second lubricant. The solvent is preferably a perfluorinated hydrocarbon, a hydrofluorocarbon, a hydrofluoroether, a chlorofluorocarbon, or a hydrochlorofluorocarbon solvent, or a combination thereof.

The lubricant composition layer of the invention can be applied to magnetic recording media, either directly on the magnetic layer or directly on a conventionally applied protective overcoat, particularly a carbon overcoat to form a substantially homogeneous topcoat lubricant, i.e., a lubricant layer which is free of any measurable disperse phase. A typical magnetic recording medium, for example, a non-magnetic substrate having sequentially deposited on each side thereof an underlayer, a magnetic layer, and a protective carbon overcoat, is submerged in the solution containing the lubricant composition and then slowly withdrawn from the solution. A conventional lifter-type dipper may be used to submerge the recording medium in the lubricant solution. The skilled artisan in the art can easily optimize the duration of submergence and the speed of withdrawal to achieve a desired coating thickness.

EXAMPLES

The following examples are included to provide those of ordinary skill in the art with a complete disclosure and description of how to make and use the compositions and methods of the invention. Efforts have been made to ensure accuracy with respect to numbers but some experimental error and deviations should, of course, be allowed for. Unless indicated otherwise, proportions are percent by weight, temperature is measured in degrees centigrade and pressure is at or near atmospheric. All components were obtained from commercially-available sources unless otherwise indicated.

Example 1

In order to determine the bonding effects of variations in lubricant composition components, various lubricant composition mixtures ranging from 0 to 100 wt. % of each of a first lubricant and a second lubricant component were prepared containing, as a first lubricant, a cyclotriphosphazene containing perfluorpolyether of Moresco A20H-4000™, and, as a second lubricant, Zdol-TX™. The lubricant compositions were prepared by mixing the first and second lubricants in a solvent bath and applied to the surface of a hard disk by dip-coating (20° C. and 55% relative humidity). Bonding of the lubricant was quantified for various time periods by rinsing the lubricated disk with the solvent(s) used to coat the lubricant onto the disk surface. Results for the lubricant compositions are depicted in FIG. 1.

As shown in FIG. 1, over time, the bonded fraction of the lubricant increases as the lubricant chemically interacts with the underlying hard overcoat layer (i.e., carbon or $SiN_x$ overcoat layers), demonstrating that the bonding kinetics and thereby the fraction of mobile lubricant on the surface of a magnetic hard disk (and thus the formation of lube moguls or ripples due to lubricant migration) can be controlled by combining a first lubricant with a second lubricant according to the invention.

Example 2

A determination of lube pooling characteristics was undertaken to assess the reduction in lubricant thickness variations, i.e. lube pooling moguls, for lubricant compositions formed from, as a first lubricant, a cyclotriphosphazene containing perfluorpolyether of Moresco A20H-4000™, and, as a second lubricant, Zdol-TX™. A second lubricant composition formed from A20H-4000™ as a first lubricant and, Zdol-4000™ as a second lubricant (a low bonding lubricant) was also prepared for comparison. The lubricant compositions were prepared by mixing the first and second lubricants in a solvent bath and applied to the surface of a hard disk by dip-coating according to Example 1. The disk was then run for 5 min. on track at 7200 RPM and at a head flying height of 8 nm. Results for the lubricant compositions are depicted in FIG. 2.

Figure 2:
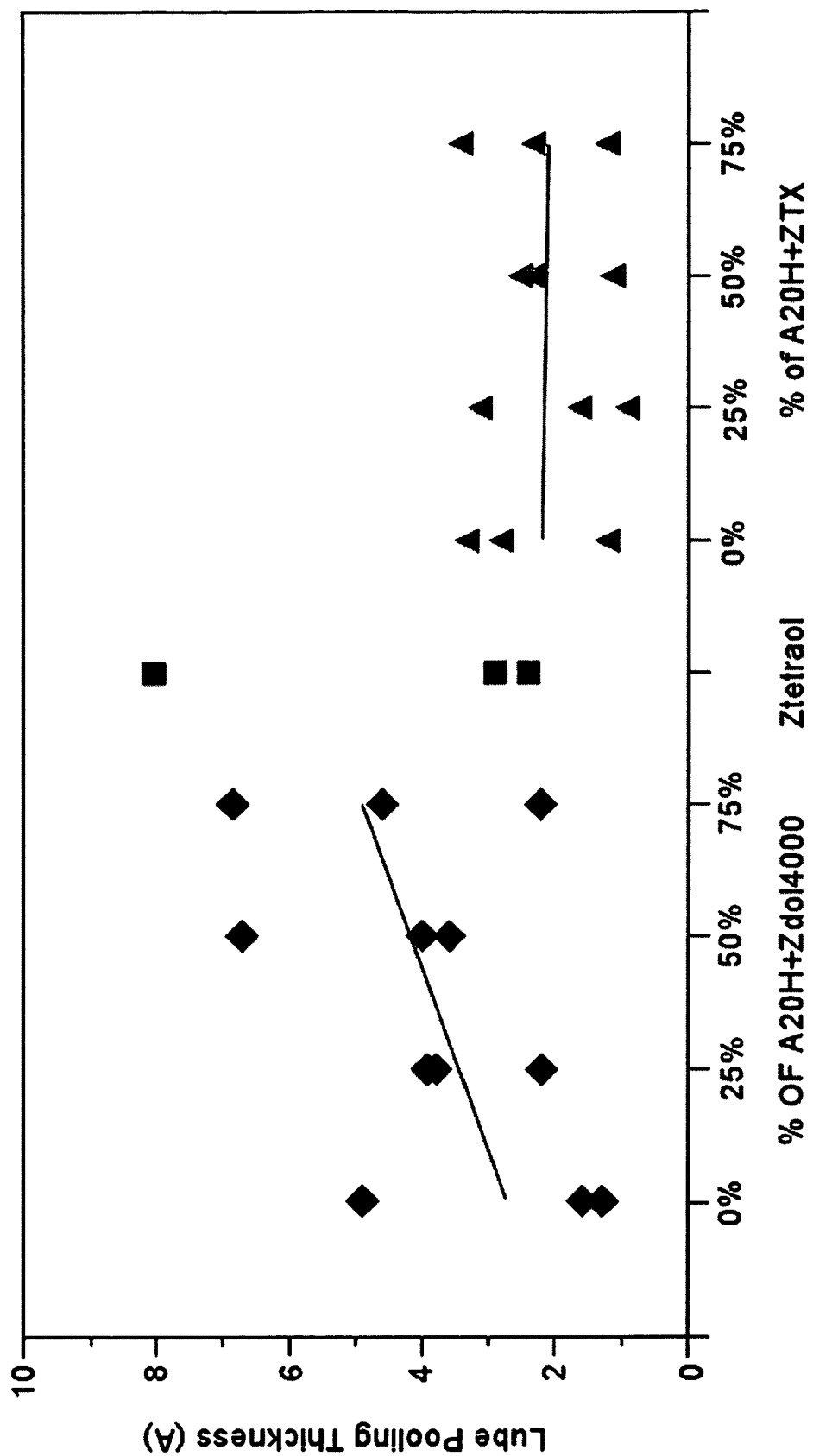
FIG. 2 shows lube pooling thickness results for lubricant compositions according to the invention comprising Moresco A20H-4000™ and Fomblin Zdol-TX™ lubricants, as well as results for comparative lubricants, as described in Example 2.

As shown in FIG. 2, lube pooling is reduced substantially for A20H™/Zdol-TX™ lubricant compositions compared with lubricant compositions containing only A20H™ (also shown in the figure in which the lube pooling thickness variation is from about 6-7 Å to about 10 Å), the increased bonding resulting from the addition of Zdol-TX™, a more strongly bonding lubricant than A20H™, providing a better resistance to the displacement of the lubricant by the action of the low flying slider. Also, as shown, a lesser bonding lubricant such as Zdol-4000™ allows for the control of lube bonding and lube pooling by varying the mixture ratio of the first to second lubricants, even though the lube pooling thickness is not reduced to the degree exhibited by the A20H™/Zdol-TX™ lubricant compositions.

For comparison, FIG. 2 further shows lube pooling results obtained for a one-component lubricant composition containing Z-Tetraol. Such one component lubricants do not allow the lubricant bonding to the disk surface to be controlled, as with the lubricant compositions of the invention, since the bonded fraction is generally high to start (approx. 40-50%) and rises asymptotically over time (to 80% or so). In addition, while the lube pooling is generally lower for Z-Tetraol (generally around 2 Å as shown in FIG. 2), other characteristics appear to limit its usefulness, however, including inadequate clearance provided for smooth magnetic disks and lower durability of the lubricant layer compared with A20H™-based lubricants and the lubricant compositions of the invention.

All patents, publications, and other published documents mentioned or referred to herein are incorporated by reference in their entireties.

It is to be understood that while the invention has been described in conjunction with the certain specific embodiments thereof, that the foregoing description as well as the examples, are intended to illustrate and not limit the scope of the invention. It should be further understood by those skilled in the art that various changes may be made and equivalents may be substituted without departing from the scope of the invention, and further that other aspects, advantages and modifications will be apparent to those skilled in the art to which the invention pertains.

We claim:

1. A lubricant composition for use as a lubricant for magnetic recording media, comprising a first liquid lubricant and a second liquid lubricant, wherein the first liquid lubricant contains a cyclotriphosphazene ring attached to at least one perfluoropolyether having a single terminal hydroxyl group and has the structure of formula (I)

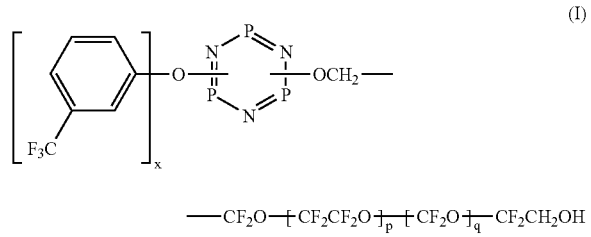

(I)

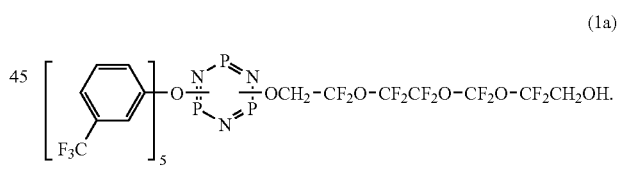

wherein, x is an integer from 1 to 5, p is an integer from 5 to 36 and q is an integer from 4 to 30 and, wherein the second liquid lubricant contains a perfluoropolyether selected from compounds having the structure of formula (IIa), formula (IIb), and combinations thereof, wherein formulae (IIa) and (IIb) have the structures

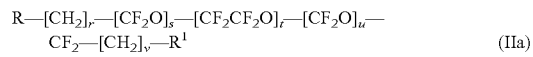

(IIa)

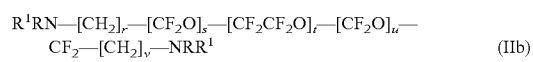

(IIb)

in which r, s, t, u and v are independently zero or an integer, with the proviso that s, t and u are not all zero, wherein when the second lubricant contains a perfluoropolyether having a structure of formula (IIa)

R and R$^1$ are independently selected from

and

and wherein when the second lubricant contains a perfluoropolyether having a structure of formula (IIb)

R and R$^1$ are independently selected from

and

wherein y is an integer from 1 to 6.

2. The lubricant composition of claim 1, wherein x is 5 such that the first liquid lubricant has the structure of formula (Ia)

(Ia)

3. The lubricant composition of claim 1, wherein the perfluoropolyether of the first liquid lubricant has a number average molecular weight of about 2000 to about 6000.

4. The lubricant composition of claim 1, wherein the perfluoropolyether of the second liquid lubricant has a number average molecular weight of about 1000 to about 6000.

5. The lubricant composition of claim 1, wherein r is zero or an integer from 1 to 6, s is zero or an integer from 1 to 40, t is zero or an integer from 1 to 40, u is zero or an integer from 1 to 6, and v is zero or an integer from 1 to 6.

6. The lubricant composition of claim 5, wherein r, u and v are each independently 0, 1 or 2, and s and t are each independently zero or an integer from 2 to 20.

7. The lubricant composition of claim 1, wherein the second liquid lubricant is selected from

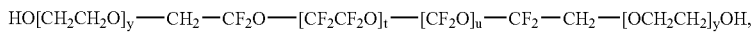

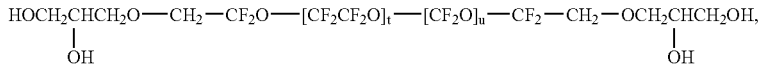

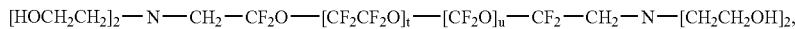

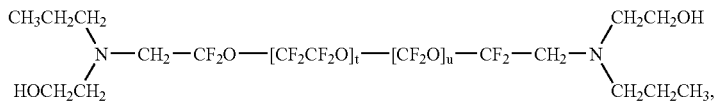

and combinations thereof.

8. The lubricant composition of claim 1, wherein the amount of the first liquid lubricant is from about 2% to about 98% by weight and the amount of the second liquid lubricant is from about 98% to about 2% by weight based on the weight of the first and second lubricants.

9. The lubricant composition of claim 8, wherein the amount of the first liquid lubricant is from about 25% to about 75% by weight and the amount of the second liquid lubricant is from about 75% to about 25% by weight based on the weight of the first and second lubricants.

10. The lubricant composition of claim 1, wherein the lubricant composition provides substantially reduced lubricant thickness variations when used as a disk lubricant for a magnetic media hard disk compared with a lubricant composition containing the first liquid lubricant but not the second liquid lubricant.

11. A magnetic recording media comprising a substrate, a magnetic layer, an overcoat layer and a lubricant layer thereon, wherein the lubricant layer is formed from the lubricant composition of claim 1.

12. The magnetic recording media of claim 1, wherein the first liquid lubricant has the structure of formula (Ia)

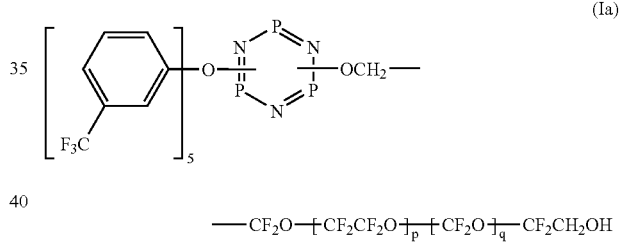

and the second liquid lubricant is selected from

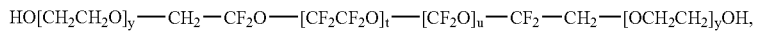

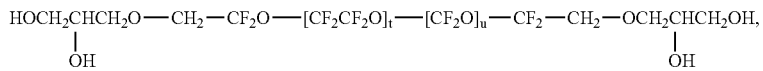

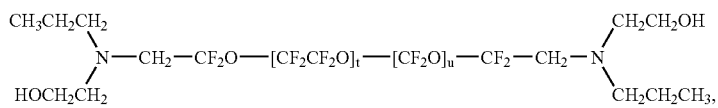

and combinations thereof.

13. The magnetic recording media of claim 12, wherein the magnetic recording media contains a hard disk and the lubricant composition provides substantially reduced lubricant thickness variations when applied to a surface of the hard disk compared with a lubricant composition containing the first liquid lubricant but not the second liquid lubricant.

14. In a magnetic recording media that includes a substrate, a magnetic layer, an overcoat layer and a lubricant layer thereon, wherein the lubricant contains a cyclotriphosphazene ring attached to at least one perfluoropolyether, the improvement which comprises utilizing a lubricant layer formed from a lubricant composition that includes a lubricant composition of claim 1 as a first liquid lubricant and a second liquid lubricant that contains a perfluoropolyether having two end groups selected from hydroxyl, tertiary amine, and combinations thereof.

15. The magnetic recording media of claim 14, wherein the liquid composition provides substantially reduced lubricant thickness variations on a surface of the magnetic recording media compared with a lubricant composition containing the first liquid lubricant but not the second liquid lubricant.

16. A method of making a magnetic recording media comprising:
   forming a magnetic layer on a substrate;
   forming a protective overcoat layer on the magnetic layer; and
   forming a lubricant layer on the surface of the overcoat layer by applying the lubricant composition of claim 1 to the surface on the overcoat layer.

* * * * *